(12) United States Patent
Nakano et al.

(10) Patent No.: US 8,069,718 B2
(45) Date of Patent: Dec. 6, 2011

(54) THERMAL FLOWMETER

(75) Inventors: Hiroshi Nakano, Hitachi (JP); Masahiro Matsumoto, Hitachi (JP); Keiji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 12/121,520

(22) Filed: May 15, 2008

(65) Prior Publication Data

US 2008/0282791 A1    Nov. 20, 2008

(30) Foreign Application Priority Data

May 16, 2007    (JP) ................................. 2007-130840

(51) Int. Cl.
*G01F 1/68* (2006.01)
(52) U.S. Cl. ..................................... 73/204.26
(58) Field of Classification Search .............. 73/204.26, 73/204.23, 204.24, 204.25
See application file for complete search history.

(56) References Cited

U.S. PATENT DOCUMENTS

| | | | |
|---|---|---|---|
| 5,237,867 A | 8/1993 | Cook, Jr. | |
| 6,629,456 B2 * | 10/2003 | Kohno | 73/204.26 |
| 6,684,695 B1 | 2/2004 | Fralick et al. | |
| 7,337,661 B2 * | 3/2008 | Yamada et al. | 73/204.26 |
| 7,395,707 B2 * | 7/2008 | Watanabe et al. | 73/204.26 |
| 7,621,180 B2 * | 11/2009 | Sakuma | 73/204.26 |
| 7,673,508 B2 * | 3/2010 | Sakuma | 73/204.26 |
| 7,703,320 B2 * | 4/2010 | Yamaguchi et al. | 73/204.26 |
| 2003/0183000 A1 * | 10/2003 | Yamada et al. | 73/204.26 |
| 2004/0244479 A1 * | 12/2004 | Matsumoto et al. | 73/204.26 |
| 2006/0037390 A1 | 2/2006 | Nakano et al. | |
| 2006/0220662 A1 * | 10/2006 | Nakano et al. | 324/693 |
| 2006/0272403 A1 | 12/2006 | Watanabe et al. | |
| 2007/0089504 A1 * | 4/2007 | Hanzawa et al. | 73/204.26 |
| 2009/0164163 A1 * | 6/2009 | Wang et al. | 702/100 |

FOREIGN PATENT DOCUMENTS

| | | |
|---|---|---|
| EP | 1 742 025 A2 | 1/2007 |
| EP | 1 746 393 A1 | 1/2007 |
| JP | 2-120620 A | 5/1990 |

(Continued)

OTHER PUBLICATIONS

European Search Report dated Aug. 25, 2008.

*Primary Examiner* — Lisa Caputo
*Assistant Examiner* — Punam Roy
(74) *Attorney, Agent, or Firm* — Crowell & Moring LLP

(57) ABSTRACT

A simply configured thermal flowmeter can provide high measurement accuracy over a long period of time by suppressing the characteristics degradation due to adhering contaminants. On the surface of a diaphragm part, a heater resistor is formed. Temperature difference sensors through are disposed on the two sides of the heater resistor (upstream and downstream sides in the flow direction of an air stream). The temperature difference sensors are disposed upstream of the heater resistor while the temperature difference sensors are disposed downstream of the heater resistor. Outside the temperature difference sensors, heating temperature sensors are formed. Control is performed so that the temperature of the heating temperature sensors is set higher than the air stream temperature by a certain degree. Therefore, even if contaminants adhere to the sensor device, the temperature of the heating temperature sensors is held constant. Since the temperature difference sensors to detect the flow rate is located between the heating temperature sensors, the temperature change due to the contamination is small. This suppresses the characteristics degradation, making it possible to provide high measurement accuracy over a long period of time.

11 Claims, 5 Drawing Sheets

FOREIGN PATENT DOCUMENTS

| | | |
|---|---|---|
| JP | 9-21668 A | 1/1997 |
| JP | 11-148849 A | 6/1999 |
| JP | 2002-48616 A | 2/2002 |
| JP | 3342926 B2 | 8/2002 |
| JP | 2006-200991 A | 8/2006 |
| JP | 2006-349687 A | 12/2006 |

* cited by examiner

THERMAL FLOWMETER

BACKGROUND OF THE INVENTION

1. Field of the Invention

The present invention relates to a thermal flowmeter having heater resistors formed on a substrate for specific flow measurement.

2. Description of the Related Art

For example, as a flow sensor to detect the amount of air taken into an automobile internal combustion engine, it has become common to use a thermal air flow sensor capable of directly measuring the mass flow.

The recently proposed thermal flowmeters include those characterized in that sensor elements are formed on a semiconductor substrate of silicon (Si) or the like by micromachining technology. In such a semiconductor type thermal flowmeter, a heater resistor is fabricated on a several-micron film formed on the semiconductor substrate. Due to the thinness, its thermal capacity is small enough to allow high speed response and low power drive.

In addition, this type of thermal flowmeter makes it easier to form a fine structure for detecting the difference between temperatures measured upstream and downstream of the heater resistor and determining the flow direction to be forward or backward.

Examples of thermal flowmeters of this type are described in Japanese Patent No. 3342926 and JP-A-2006-200991.

SUMMARY OF THE INVENTION

However, if a thermal flowmeter is used to detect, for example, the amount of air taken into an automobile internal combustion engine, oil, dust and other contaminants in the intake air collide with and adhere to the sensor device, resulting in measurement errors. Especially, when an object has a portion on its surface that undergoes a rapid temperature change from low to high temperature, contaminants are more likely to deposit on that portion.

In the case of a sensor device manufactured according to a conventional technique where a heater resistor is fabricated on a film formed on a substrate and the difference between temperatures measured upstream and downstream of the heater resistor is detected by using temperature sensing resistors or the like, if contaminants adhere to a peripheral part of the film, characteristics of the sensor device change since the temperature of the temperature sensing resistor to detect the air temperature upstream or downstream of the heater resistor is lowered.

However, since the above-mentioned conventional technique gives no consideration to adhering contaminants, the characteristics change of the sensor device due to the contamination has been a factor impeding the improvement of thermal flowmeters in measurement accuracy.

It is an object of the present invention to realize a simply configured thermal flowmeter capable of keeping high measurement accuracy over a long period of time by suppressing the characteristics degradation due to adhering contaminants.

To attain the above-mentioned object, the present invention is embodied as described below.

In one aspect of the present invention, a thermal flowmeter to measure the flow rate of a fluid comprises: a first temperature difference sensor disposed upstream of a heater resistor in the flowing direction of the fluid to be measured and a second temperature difference sensor disposed downstream of the heater resistor in the flowing direction of the fluid to be measured; a first heating temperature sensor disposed upstream of the first temperature difference sensor and a second heating temperature sensor disposed downstream of the second temperature difference sensor; heating control means for controlling the heating current to be supplied to the heater resistor based on the temperature change detected by the first heating temperature sensor and the second heating temperature sensor so that the average temperature of the first heating temperature sensor and the second heating temperature sensor settles to a predetermined temperature; and detection means for measuring the flow rate of the fluid according to the difference between the temperatures detected by the first temperature difference sensor and the second temperature difference sensor.

In another aspect of the present invention, a thermal flowmeter to measure the flow rate of a fluid comprises: a first heating temperature sensor disposed upstream of a heater resistor in the flowing direction of the fluid to be measured and a second heating temperature sensor disposed downstream of the heater resistor in the flowing direction of the fluid to be measured; first two temperature difference sensors, one being disposed upstream of the first heating temperature sensor, the other being disposed between the first heating temperature sensor and the heater resistor, and second two temperature difference sensors, one being disposed downstream of the second heating temperature sensor, the other being disposed between the second heating temperature sensor and the heater resistor; heating control means for controlling the heating current to be supplied to the heater resistor based on the temperature change detected by the first heating temperature sensor and the second heating temperature sensor so that the average temperature of the temperature detected by the first heating temperature sensor and the temperature detected by the second heating temperature sensor settles to a predetermined temperature; and detection means for measuring the flow rate of the fluid according to the difference between the temperature detected by the first temperature difference sensors and the temperature detected by the second temperature difference sensors.

In still another aspect of the present invention, a thermal flowmeter to detect the flow rate of a fluid comprises: a first temperature difference sensor disposed upstream of a heater resistor in the flowing direction of the fluid to be measured and a second temperature difference sensor disposed downstream of the heater resistor in the flowing direction of the fluid to be measured; a first heating temperature sensor disposed on top of the first temperature difference sensor via an insulation film and a second heating temperature sensor disposed on top of the second temperature difference sensor via an insulation film; heating control means for controlling the heating current to be supplied to the heater resistor based on the temperature change detected by the first heating temperature sensor and the second heating temperature sensor so that the average temperature of the temperature detected by the first heating temperature sensor and the temperature detected by the second heating temperature sensor settles to a predetermined temperature; and detection means for measuring the flow rate of the fluid according to the difference between the temperatures detected by the first temperature difference sensor and the second temperature difference sensor.

In a further aspect of the present invention, a thermal flowmeter to detect the flow rate of a fluid comprises: a bridge circuit comprising a first heater resistor, a second heater resistor, a third heater resistor and a fourth heater resistor wherein the third heater resistor and the fourth heater resistor are disposed downstream of the first heater resistor and the second heater resistor in the flowing direction of the fluid to be measured, and the bridge circuit is formed by connecting a series circuit constituted of the first heater resistor and the third heater resistor in parallel with a series circuit constituted of the second heater resistor and the fourth heater resistor; a first heating temperature sensor disposed upstream of the first heater resistor and the second heater resistor in the flowing direction of the fluid to be measured and a second heating temperature sensor disposed downstream of the third heater resistor and the fourth heater resistor in the flowing direction of the fluid to be measured; heating control means for controlling the heating current to be supplied to the first, second, third and fourth heater resistors based on the temperature detected by the first and second heating temperature sensors so that the average temperature of the first, second, third and fourth heater resistors settles to a predetermined temperature; and detection means for measuring the flow rate of the fluid according to the differential voltage from the bridge circuit.

In a still further aspect of the present invention, a thermal flowmeter to measure the flow rate of a fluid comprises: a bridge circuit comprising a first heater resistor, a second heater resistor, a third heater resistor and a fourth heater resistor wherein the third heater resistor and the fourth heater resistor are disposed downstream of the first heater resistor and the second heater resistor in the flowing direction of the fluid to be measured, and the bridge circuit is formed by connecting a series circuit constituted of the first heater resistor and the third resistor in parallel with a series circuit constituted of the second heater resistor and the fourth heater resistor; a first heating temperature sensor disposed on top of the first heater resistor and the second heater resistor via an insulation film and a second heating temperature sensor disposed on top of the third heater resistor and the fourth heater resistor via an insulation film; heating control means for controlling the heating current to be supplied to the first, second, third and fourth heater resistors based on the temperature detected by the first and second heating temperature sensors so that the average temperature of the first, second, third and fourth heater resistors settles to a predetermined temperature; and detection means for measuring the flow rate of the fluid according to the differential voltage from the bridge circuit.

According to the present invention, it is possible to realize a simply configured thermal flowmeter capable of keeping high measurement accuracy over a long period of time by suppressing the characteristics degradation due to adhering contaminants.

BRIEF DESCRIPTION OF THE DRAWINGS

For comparison.

DETAILED DESCRIPTION OF THE PREFERRED EMBODIMENTS

With reference to the attached drawings, embodiments of the present invention will be described below.

First, the following describes the basic configuration and operation principle of a thermal flowmeter according to a first embodiment of the present invention.

Figure 1:
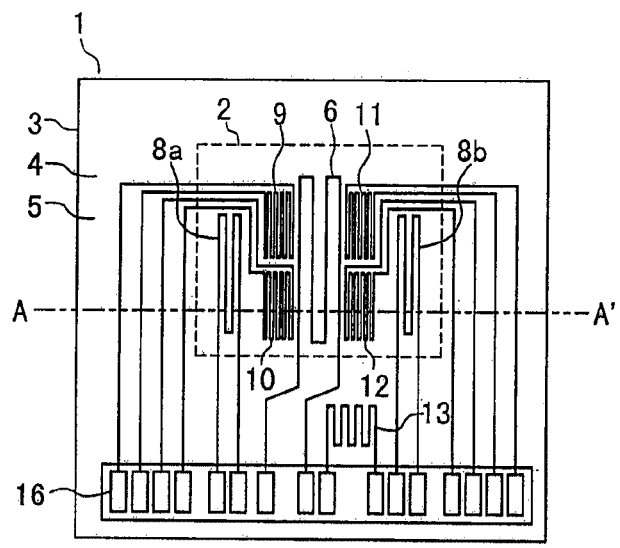
FIG. 1 is a plan view of a sensor device in a thermal flowmeter, a first embodiment of the present invention.
Figure 2:
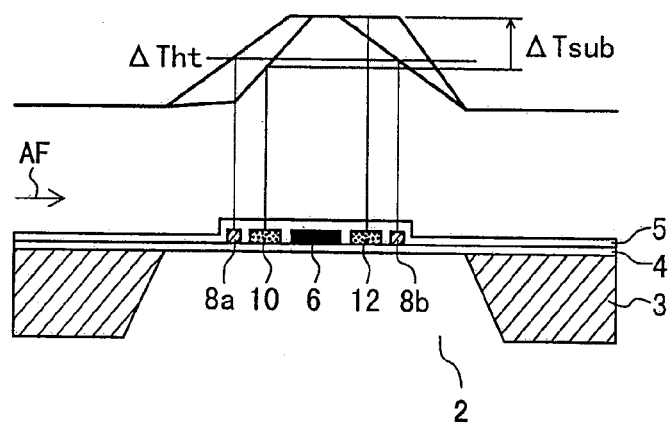
FIG. 2 shows a cross-section along the line A-A' in FIG. 1, including temperature distributions there.

FIG. 1 is a plan view of a sensor device 1 of the thermal flowmeter according to the first embodiment of the present invention. FIG. 2 depicts a cross-section along the line A-A' in FIG. 1 and shows temperature distributions across a diaphragm part 2.

In FIG. 1 and FIG. 2, the substrate 3 of the sensor device 1 is made of silicon, ceramic or other higher heat conductive materials. An insulation film 4 is formed on the substrate 3, and then the substrate 3 is etched from its back side so as to form the diaphragm part 2 under the insulation film 4.

On the surface of the diaphragm part 2, a heater resistor 6 is formed. This heater resistor 6 is heated so that its temperature is higher than that of an air stream AF (fluid flow to be measured) by a certain degree. In addition, temperature difference sensors 9, 10, 11 and 12, which are temperature sensing resistors, are disposed on the two sides of the heater resistor 6 (upstream and downstream sides in the flow direction of the air stream AF). The temperature difference sensors 9 and 10 (first temperature sensing resistors) are disposed upstream of the heater resistor 6 while the temperature difference sensors 11 and 12 (second temperature sensing resistors) are disposed downstream of the heater resistor 6.

In addition, heating temperature sensors 8a and 8b which are temperature sensing resistors are disposed on the two sides of the temperature difference sensors 9, 10, 11 and 12 (upstream and downstream sides in the flow direction of the air stream AF). The heating temperature sensor 8a (third temperature sensing resistor) is disposed upstream of the temperature difference sensors 9 and 10 while the heating temperature sensor 8b (fourth temperature sensing resistor) is disposed downstream of the temperature difference sensors 11 and 12. An insulation film 5 is formed to cover the temperature difference sensors 9, 10, 11, and 12 and the heating temperature sensors 8a and 8b.

Near the diaphragm 2, a temperature sensing resistor 13 (fifth temperature sensing resistor) is formed on the insulation film 4 on the substrate 3. Its resistance changes in response to the temperature of the air stream AF. A bridge circuit is constructed by combining the temperature sensing resistor 13, the heating temperature sensors 8a and 8b, and resistors 14 and 15 described later. This bridge circuit detects the temperature changes of the heating temperature sensors 8a and 8b. This result of the detection is used to control the heating current to the heater resistor 6.

Specifically, heating control is performed so that the temperatures of the heating temperature sensors 8a and 8b become higher than air stream temperature by a certain degree.

The solid line in FIG. 2 shows the temperature distribution across the diaphragm 2 in a no-flow condition. As shown in FIG. 2, the heating temperature sensors 8a and 8b are heated so as to set their temperature higher than air temperature T by ΔTht.

The broken line in FIG. 2 shows the temperature distribution across the diaphragm 2 in the presence of the air stream AF. As shown in FIG. 2, the presence of the air stream lowers the temperature upstream of the heater resistor 6 and raises the temperature downstream thereof.

Thus, in the presence of the air stream, although the temperature of the heating temperature sensor 8a falls and the temperature of the heating temperature sensor 8b rises relative to the case of the air stream's absence, control is performed so that the average temperature of the heating temperature sensors 8a and 8b is kept at ΔTht. Further, the temperature of the temperature difference sensors 9 and 10 falls while the temperature of the temperature difference sensors 11 and 12 rises. By detecting this temperature difference ΔTsub between the upstream and downstream sides, it is possible to obtain a signal which corresponds to the air flow rate.

Preferably, the material used to form the heater resistor 6, heating temperature sensors 8a and 8b, temperature difference sensors 9, 10, 11 and 12 and temperature sensing resistor 13 has a high temperature coefficient of resistance, that is, changes in resistance relatively greatly with temperature. Thus, impurity-doped polycrystalline or monocrystalline silicon and such metal materials as platinum, molybdenum, tungsten and nickel alloy may be used. Preferably, the heater resistor 6, heating temperature sensors 8a and 8b, temperature difference sensors 9, 10, 11 and 12 and temperature sensing resistor 13 are made of a metal material having a temperature coefficient of resistance not lower than 1000 ppm/° C.

The heater resistor 6, heating temperature sensors 8a and 8b, temperature difference sensors 9, 10, 11 and 12 and temperature sensing resistor 13 are covered or protected by an insulation film 5.

On the sensor device 1, an electrode pad group 16 is connected with the heater resistor 6, heating temperature sensors 8a and 8b, temperature difference sensors 9, 10, 11 and 12 and temperature sensing resistor 13. This electrode pad group 16 is connected to a drive circuit by bonding wires.

On the sensor device 1 in the first embodiment of the present invention, each of the heater resistor 6, heating temperature sensors 8a and 8b, temperature difference sensors 9, 10, 11 and 12 and temperature sensing resistor 13 is provided with electrode pads. However, since they are made of the same material, interconnection is possible before the pad group. It is especially advantageous to interconnect the heating temperature sensors 8a and 8b, temperature sensing resistor 13 and temperature difference sensors 9, 10, 11 and 12 since they form bridge circuits. This reduces the number of electrode pads and wire bondings, resulting in a smaller and lower cost sensor device.

The following describes a drive/detect circuitry for and with the sensor device 1 in the first embodiment of the present invention.

Figure 3:
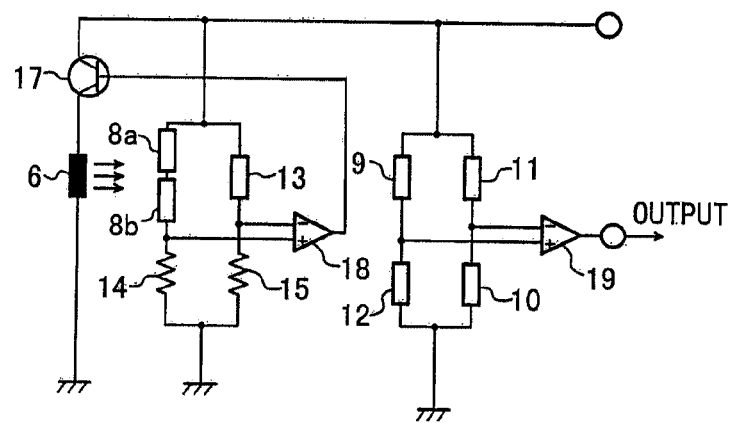
FIG. 3 shows a drive circuit for the sensor device in the first embodiment.

FIG. 3 shows the drive/detect circuitry for and with the sensor device 1 in the first embodiment of the present invention.

In FIG. 3, a series circuit constituted of the heating temperature sensors 8a and 8b and resistor 14 is connected in parallel with a series circuit constituted of the temperature sensing resistor 13 and resistor 15. This constitutes a bridge circuit. A differential voltage, obtained from the voltage (midpoint voltage) at the point of connection between the heating temperature sensor 8b and the resistor 14 and the voltage (midpoint voltage) at the point of connection between the temperature sensing resistor 13 and the resistor 15, is supplied to the input terminals of a differential amplifier 18.

The output signal of the differential amplifier 18 is supplied to the base of a transistor 17. This transistor 17 has an emitter connected to the heater resistor 6. In response to the output from the amplifier 18, the transistor 17 sends a current to the heater resistor 6 to heat it. By this configuration, heating control is performed so as to set the temperature of the heating temperature sensors 8a and 8b higher than the air temperature by a certain degree.

A series circuit constituted of the temperature difference sensors 9 and 12 is connected in parallel with a series circuit constituted of the temperature difference sensors 11 and 10. This constitutes a bridge circuit. The differential output of this bridge circuit is a voltage which changes depending on the temperature difference caused by the air flow. An amplifier 19 detects this voltage and provides an output which corresponds to air flow rate.

Although the drive/detect circuitry in the first embodiment of the present invention is an analog circuit comprising the amplifier 19 and the transistor 17, it is also possible to digitally construct this circuitry by using AD and DA converters.

If a thermal flowmeter is used in an automobile or the like to detect the amount of air taken into the internal combustion engine, characteristics of the sensor device may change since dust, oil and other contaminants in the intake air collides with and adhere to the sensor device. Contamination of the sensor device accumulates with time, making it difficult to secure a certain level of measurement accuracy over a long period of time.

Especially, when an object has a portion on its surface that undergoes a rapid temperature change from low to high temperature, contaminants are more likely to deposit on that portion. In the case of a thermal flowmeter, contaminants are more likely to deposit near the periphery of the sensor device's diaphragm. If such parts are contaminated, the temperature distribution across the diaphragm changes, resulting in changed characteristics of the sensor.

Figure 4:
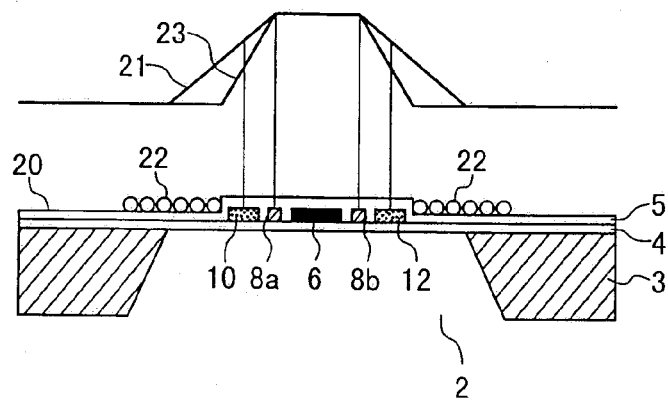
FIG. 4 shows the influence of adhering contaminants in a thermal flowmeter not of the present invention.

The effect of contaminants adhering to a sensor device is described below with reference to FIG. 4. FIG. 4 shows a cross-section of a diaphragm of a sensor device not of the present invention. FIG. 4 also shows its temperature distribution along that cross-section in a no-flow condition.

In FIG. 4, the sensor device has heating temperature sensors 8a and 8b disposed on the two sides of an heater resistor 6. A temperature difference sensor 10 is disposed upstream of the heating temperature sensor 8a; a temperature difference sensor 12 is disposed downstream of the heating temperature sensor 8b. Driving the thus-arranged sensor device to apply a heating current to the heater resistor 6 results in the temperature distribution indicated by a solid line 21 in FIG. 4.

If contaminants 22 deposit near the periphery of the diaphragm, the temperature distribution across the diaphragm falls as indicated by a broken line 23 in FIG. 4. Especially, the temperature difference sensors 10 and 12 show a large temperature fall since they are formed near the periphery of the diaphragm outside the heating temperature sensors 8a and 8b.

If the temperature of the temperature difference sensors 10 and 12 falls, the temperature difference caused by the air stream between the upstream temperature difference sensor 10 and the downstream temperature difference sensor 12 becomes smaller. This lowers the sensitivity of the sensors and increases detection errors.

Figure 5:
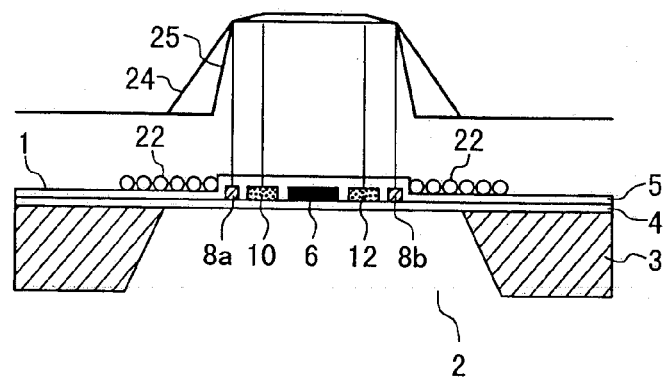
FIG. 5 shows the influence of adhering contaminants in the first embodiment of the present invention.

With reference to FIG. 5, the following describes the sensor device structure of the present invention which eliminates the detection error factor characteristic of the above-mentioned sensor device structure not of the present invention. FIG. 5 shows a cross-section of the diaphragm of the sensor device 1 in the first embodiment of the present invention. FIG. 5 also shows its temperature distribution along that cross-section in a no-flow condition.

In FIG. 5, the heating temperature sensors 8a and 8b of the sensor device 1 are respectively disposed outside the temperature difference sensors 10 and 12. Without contamination, the temperature distribution is as indicated by a solid line 24 in FIG. 5. If contaminated, the temperature distribution changes as indicated by a broken line 25 in FIG. 5.

The thermal flowmeter according to the first embodiment of the present invention is configured so as to keep the heating temperature sensors 8a and 8b at a constant temperature. Even if contaminants deposit, the heating temperature sensors 8a and 8b are held at a constant temperature. Thus, although the adhering contaminants lower the temperature outside (upstream and downstream of) the heating temperature sensors 8a and 8b, the inside temperature fall (downstream of 8a and upstream of 8b) is small.

Therefore, even if contaminants adhere to the sensor device 1, the temperature difference sensors 10 and 12 that detect air flow rates do not show a large temperature fall since they are disposed inside the heating temperature sensors 8a and 8b. It is therefore possible to suppress the characteristics degradation and retain high measurement accuracy over a long period of time.

That is, according to the first embodiment of the present invention, it is possible to realize a simply configured thermal flowmeter capable of suppressing the characteristics degradation due to adhering contaminants and consequently retaining high measurement accuracy over a long period of time.

The following describes a second embodiment of the present invention.

Figure 6:
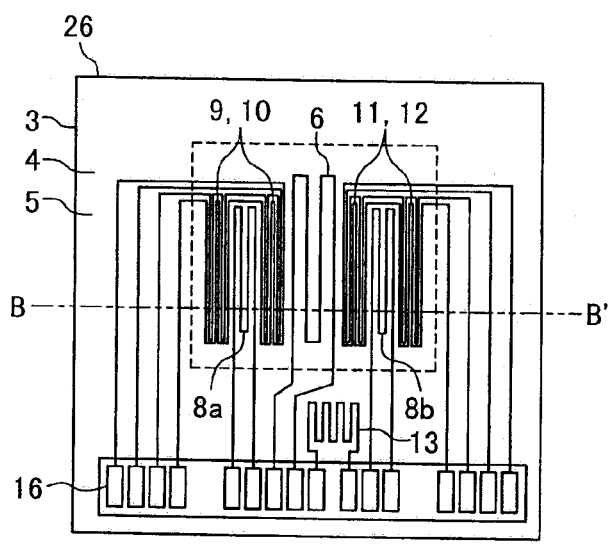
FIG. 6 is a plan view of a sensor device in a thermal flowmeter, a second embodiment of the present invention.
Figure 7:
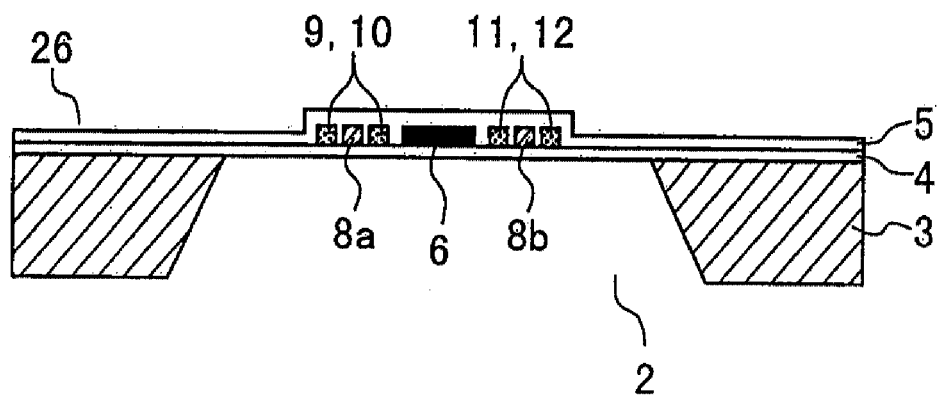
FIG. 7 shows a cross-section along the line B-B' in FIG. 6.

FIG. 6 is a plan view of a sensor device 26 in the second embodiment of the present invention. FIG. 7 depicts a cross-section along the line B-B' in FIG. 6.

What differentiates the thermal flowmeter according to the second embodiment of the present invention from that of the first embodiment is the arrangement of the heating temperature sensors 8a and 8b and temperature difference sensors 9, 10, 11 and 12. The drive/detect method for and with the sensor device 26 is the same as in the first embodiment. The following describes what is different from the first embodiment.

In FIG. 6 and FIG. 7, the temperature difference sensors 9 and 10 are patterned upstream of the heater resistor 6 so that they are disposed respectively upstream and downstream of the upstream heating temperature sensor 8a. That is, the upstream heating temperature sensor 8a is sandwiched between the upstream temperature difference sensors 9 and 10.

The downstream side of the heater resistor 6 is similar to the upstream side. The downstream heating temperature sensor 8b is sandwiched between the downstream temperature difference sensors 11 and 12. The temperature difference sensor 11 is disposed upstream of the temperature difference sensor 12.

As compared with the first embodiment, the second embodiment which is configured as mentioned above brings closer the average temperature of the heating temperature sensors 8a and 8b and the average temperature of the temperature difference sensors 9, 10, 11 and 12. It is therefore possible to further reduce the temperature fall due to adhering contaminants.

That is, according to the second embodiment of the present invention, it is possible to realize a simply configured thermal flowmeter capable of suppressing the characteristics degradation due to adhering contaminants and consequently retaining high measurement accuracy over a long period of time. In addition, as compared with the first embodiment, the temperature fall due to adhering contaminants can be reduced further.

The following describes a third embodiment of the present invention.

Figure 8:
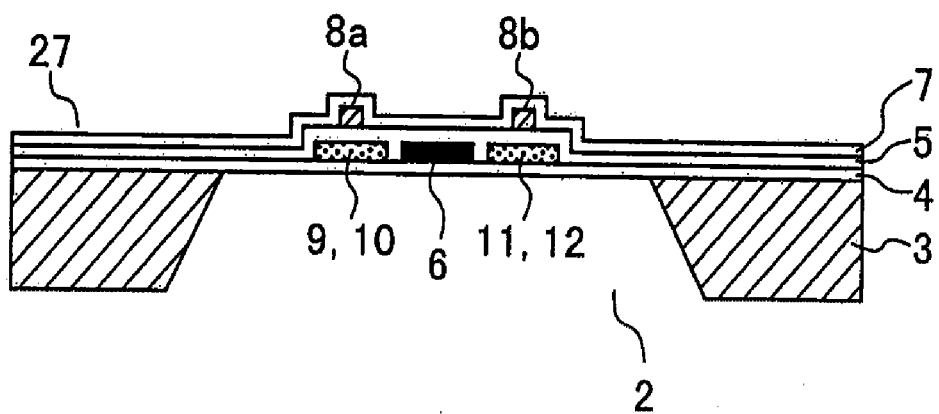
FIG. 8 shows a cross-section of a sensor device in a thermal flowmeter, a third embodiment of the present invention.

FIG. 8 depicts a cross-section of the diaphragm of a sensor device 27 in the third embodiment of the present invention. What differentiates the thermal flowmeter according to the third embodiment of the present invention from that of the second embodiment is the arrangement of the heating temperature sensors 8a and 8b and temperature difference sensors 9, 10, 11 and 12 in the sensor device 26. The drive/detect method for and with the sensor device is the same as in the first embodiment. The following describes what is different from the first embodiment.

Viewed from the top of the sensor device 27 shown in FIG. 8, the heating temperature sensors 8a and 8b are disposed on the temperature difference sensors 9, 10, 11 and 12 via the insulation film 5. That is, viewed from the top of the sensor device 27, the upstream heating temperature sensor 8a overlaps with the upstream temperature difference sensors 9 and 10 while the downstream heating temperature sensor 8b overlaps with the downstream temperature difference sensors 11 and 12. Further, an insulation film 7 is formed to cover the heating temperature sensors 8a and 8b.

As compared with the first and second embodiments, the third embodiment which is configured as mentioned above brings even closer the average temperature of the heating temperature sensors 8a and 8b and the average temperature of the temperature difference sensors 9, 10, 11 and 12. It is therefore possible to still further reduce the temperature fall due to adhering contaminants.

That is, according to the third embodiment of the present invention, it is possible to realize a simply configured thermal flowmeter capable of suppressing the characteristics degradation due to adhering contaminants and consequently retaining high measurement accuracy over a long period of time. In addition, as compared with the first and second embodiments, the temperature fall due to adhering contaminants can be reduced further.

Although the third embodiment has the heating temperature sensors 8a and 8b formed above the temperature sensors 9, 10, 11 and 12, the same effect can also be attained even if this arrangement is turned upside down.

The following describes a fourth embodiment of the present invention.

Figure 9:
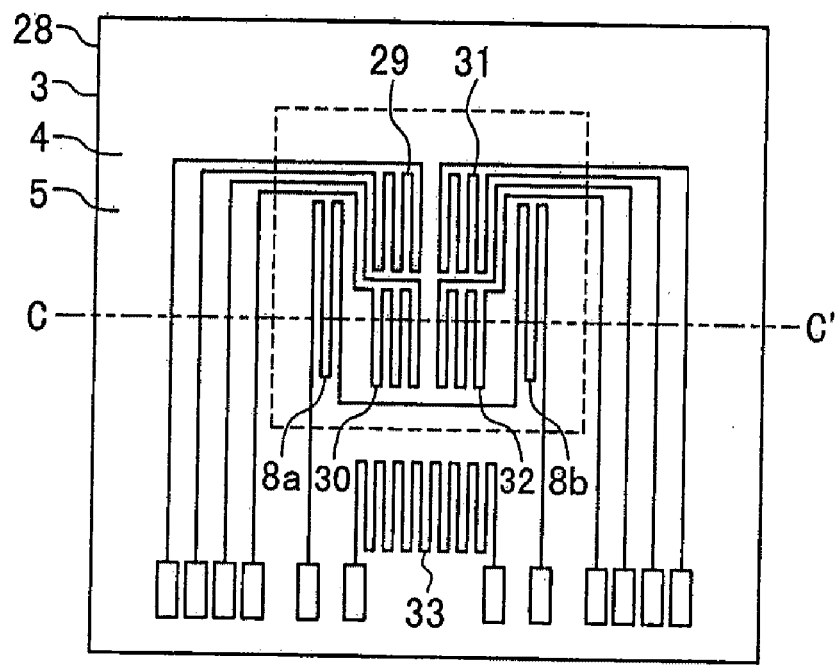
FIG. 9 is a plan view of a sensor device in a fourth embodiment of the present invention.
Figure 10:
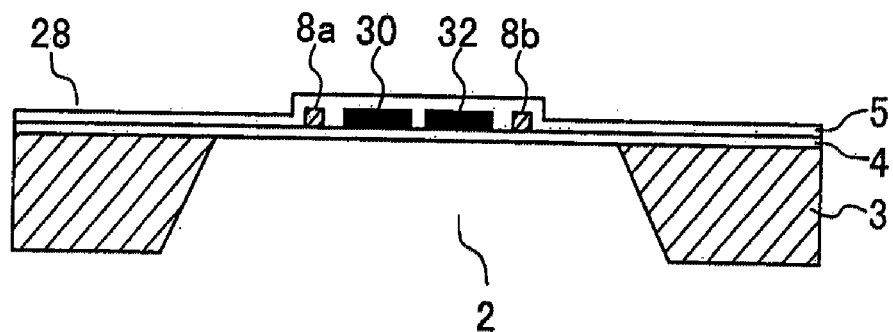
FIG. 10 shows a cross-section along the line C-C' in FIG. 9, including temperature distributions there.

FIG. 9 is a plan view of a sensor device 28 in the fourth embodiment of the present invention. FIG. 10 depicts a cross-section along the line C-C' in FIG. 9.

In FIG. 9 and FIG. 10, the substrate 3 of the sensor device 28 is made of silicon, ceramic or other higher heat conductive materials. The insulation film 4 is formed on the substrate 3, and then the substrate 3 is etched from its back side so as to form the diaphragm part 2 under the insulation film 4.

On the surface of the diaphragm part 2, heater resistors 29, 30, 31 and 32 (first through fourth heater resistors) are formed. In the air stream direction, the heater resistors 29 and 30 (first and second heater resistors) are disposed upstream of the center of the diaphragm 2 while the heater resistors 31 and 32 (third and fourth heater resistors) are disposed downstream of the center of the diaphragm 2. These heater resistors 29, 30, 31 and 32 form a bridge circuit.

The heating temperature sensor 8a is disposed upstream of the heater resistors 29 and 30 while the heating temperature sensor 8b is disposed downstream of the heater resistors 31 and 32. Near the diaphragm 2, a temperature sensing resistor 33 is formed on the insulation film 4 on the substrate 3. Its resistance changes in response to air temperature.

A bridge circuit is constructed by combining the temperature sensing resistor 33 and heating temperature sensors 8a and 8b. This bridge circuit detects temperature changes of the heating temperature sensors 8a and 8b. The result of the detection is used to control the heating current to the heater resistors 29, 30, 31 and 32. That is, heating control is performed so that the temperatures of the heating temperature sensors 8a and 8b become higher than air stream temperature by a certain degree.

For each of the heater resistors 29, 30, 31 and 32, electrodes are separately formed. However, since these are made of the same material, interconnection is possible on the sensor device 28.

In the fourth embodiment of the present invention, the heating temperature sensors 8a and 8b are connected in series on the sensor device 28. Alternatively, separate electrodes may be provided for each of the heating temperature sensors 8a and 8b to connect them on a drive circuit board or the like outside the sensor device 28 as in the first embodiment.

Preferably, the material used to form the heater resistors 29, 30, 31 and 32, heating temperature sensors 8a and 8b and temperature sensing resistor 33 has a high temperature coefficient of resistance, that is, changes in resistance relatively greatly with temperature. In the fourth embodiment of the present invention, impurity-doped polycrystalline silicon is exemplarily used to make the heater resistors 29, 30, 31 and 32, heating temperature sensors 8a and 8b and temperature sensing resistor 33. In addition to this example, impurity-doped monocrystalline silicon and such metal materials as platinum, molybdenum, tungsten and nickel alloy may be used.

In the fourth embodiment of the present invention, there are many wiring lines to connect the heater resistors 29, 30, 31 and 32 to their respective electrode pads. This increases the wiring resistance and consequently increases power loss by the wiring lines. It is thus preferable to reduce the wiring resistance by using platinum, molybdenum, tungsten or other lower resistance metal materials.

The following describes a drive/detect circuitry for and with the sensor device 28 in the fourth embodiment of the present invention.

Figure 11:
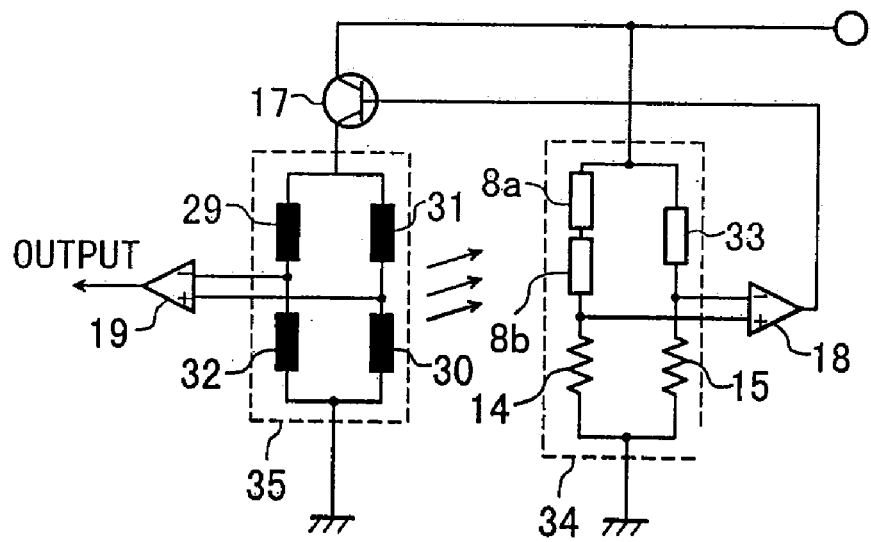
FIG. 11 shows a drive circuit for the sensor device in the thermal flowmeter according to the fourth embodiment of the present invention.

FIG. 11 shows the drive/detect circuitry for and with the sensor device 28 in the fourth embodiment of the present invention.

In FIG. 11, a series circuit constituted of the heating temperature sensors 8a and 8b and resistor 14 is connected in parallel with a series circuit constituted of the temperature sensing resistor 33 and resistor 15. This constitutes a bridge circuit 34. A differential voltage, obtained from the midpoint voltage between the heating temperature sensor 8b and the resistor 14 and the midpoint voltage between the temperature sensing resistor 33 and the resistor 15, is entered into the amplifier 18.

In addition, a series circuit constituted of the heater resistors 29 and 32 is connected in parallel with a series circuit constituted of the heater resistors 31 and 30. This constitutes a bridge circuit 35. The output signal of the amplifier 18 is supplied to the base of the transistor 17. This transistor 17 has an emitter connected to the heater resistors 29 and 31 of the bridge circuit 35. By this configuration, heating control is performed so as to set the average temperature of the heating temperature sensors 8a and 8b higher than the air temperature by a certain degree.

The heater resistors 29, 30, 31 and 32 of the sensor device 28 are such that if an air stream occurs, the temperature of the upstream heater resistors 29 and 30 falls while the temperature of the downstream heater resistors 31 and 32 rises. By detecting this temperature difference, it is thus possible to obtain a signal which corresponds to the air flow.

Specifically, by detecting the differential voltage from the bridge circuit 35, namely the midpoint voltage between the heater resistors 29 and 30 and the midpoint voltage between the heater resistors 31 and 32, the amplifier 19 can provide an output which corresponds to the air flow rate.

Although the drive/detect circuit in the fourth embodiment of the present invention is also an analog circuit comprising the amplifier 19 and the transistor 17, it is also possible to digitally construct this circuit by using AD and DA converters.

Since the sensor device 28 in the fourth embodiment keeps the average temperature of the heating temperature sensors 8a and 8b constant in the same manner as in the first through third embodiments described earlier, the effect of contaminants adhering near the periphery of the diaphragm 2 is small.

Further, the fourth embodiment of the present invention detects the temperature changes of the plural heater resistors 29 through 32, eliminating the necessity of providing temperature difference sensors separately for detection. It is therefore possible to downsize the diaphragm 2 and reduce the thermal capacity thereof. This realizes a high-speed-response thermal flowmeter.

In addition, since temperature difference sensors which would exert thermal influence are eliminated, it is possible to realize a high-accuracy and low-power-consumption thermal flowmeter.

Further, since the fourth embodiment of the present invention detects a differential output by using the four heater resistors 29 through 32, the electrical noise included in the voltage of the transistor 17 can be cancelled.

The following describes a fifth embodiment of the present invention. In terms of the drive/detect method, the fifth embodiment of the present invention is basically the same as the fourth embodiment of the present invention. Therefore, the following describes only what is different from the fourth embodiment.

Figure 12:
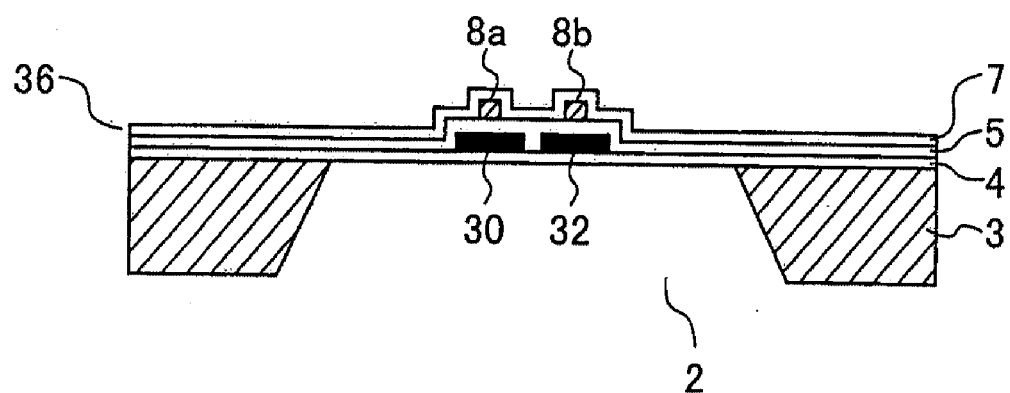
FIG. 12 shows a cross-section of a sensor device in a thermal flowmeter, a fifth embodiment of the present invention.

FIG. 12 shows a cross-section of the diaphragm of a sensor device 36 in the fifth embodiment of the present invention. Viewed from the top of the sensor device 36 shown in FIG. 12, the heating temperature sensors 8a and 8b are disposed on the heater resistors 29, 30, 31 and 32 via the insulation film 5. That is, the upstream heating temperature sensor 8a overlaps with the upstream heater resistors 29 and 30 while the downstream heating temperature sensor 8b overlaps with the downstream heater resistors 31 and 32.

As compared with the fourth embodiment, the fifth embodiment which is configured as mentioned above brings closer the average temperature of the heating temperature sensors 8a and 8b and the average temperature of the heater resistors 29, 30, 31 and 32. It is therefore possible to further reduce the temperature fall due to adhering contaminants.

Although the fifth embodiment has the heating temperature sensors 8a and 8b formed above the heater resistors 29, 30, 31 and 32, the same effect can also be attained even if this arrangement is turned upside down.

If any of the thermal flowmeters of the present invention described so far is applied to an internal combustion engine control system, it is possible to improve the control accuracy of the internal combustion engine since the air flow measurement accuracy is improved.

Further, the thermal flowmeters of the present invention are applicable not only to internal combustion engine control systems but also to other gas flow sensors such as hydrogen gas sensors.

What is claimed is:

1. A thermal flowmeter having a thin film part formed on a substrate and a heater resistor disposed on the thin film part for measuring the flow rate of a fluid flow, said flowmeter comprising:
   a first temperature difference sensor disposed upstream of the heater resistor in the flow direction of the fluid;
   a second temperature difference sensor disposed downstream of the heater resistor in said flow direction;
   a first heating temperature sensor disposed on the thin film part of the flowmeter upstream of the first temperature difference sensor;
   a second heating temperature sensor disposed on the thin film part of the flowmeter downstream of the second temperature difference sensor;
   a heating control device that controls the heating current supplied to the heater resistor based on the temperature change of the first and second heating temperature sensors, so that the average temperature of the first and second heating temperature sensors settles to a value that exceeds the temperature of said fluid by a predetermined amount; and
   detection means for measuring the flow rate of the fluid according to the difference between the temperatures detected by the first and second temperature difference sensors.

2. A thermal flowmeter having a thin film part formed on a substrate and a heater resistor disposed on the thin film part for measuring the flow rate of a fluid, comprising:
   a first heating temperature sensor disposed upstream of the heater resistor in the flowing direction of the fluid to be measured and a second heating temperature sensor disposed downstream of the heater resistor in the flowing direction of the fluid to be measured;
   first two temperature difference sensors, one being disposed upstream of the first heating temperature sensor, the other being disposed between the first heating temperature sensor and the heater resistor, and second two temperature difference sensors, one being disposed downstream of the second heating temperature sensor, the other being disposed between the second heating temperature sensor and the heater resistor;
   heating control means for controlling the heating current to be supplied to the heater resistor based on the temperature change detected by the first heating temperature sensor and the second heating temperature sensor so that the average temperature of the temperature detected by the first heating temperature sensor and the temperature detected by the second heating temperature sensor settles to a predetermined temperature; and
   detection means for measuring the flow rate of the fluid according to the difference between the temperature detected by the first temperature difference sensors and the temperature detected by the second temperature difference sensors.

3. A thermal flowmeter having a thin film part formed on a substrate and a heater resistor disposed on the thin film part for measuring the flow rate of a fluid, comprising:
   a first temperature difference sensor disposed upstream of the heater resistor in the flowing direction of the fluid to be measured and a second temperature difference sensor disposed downstream of the heater resistor in the flowing direction of the fluid to be measured;
   a first heating temperature sensor disposed on top of the first temperature difference sensor via an insulation film and a second heating temperature sensor disposed on top of the second temperature difference sensor via an insulation film;
   heating control means for controlling the heating current to be supplied to the heater resistor based on the temperature change detected by the first heating temperature sensor and the second heating temperature sensor so that the average temperature of the temperature detected by the first heating temperature sensor and the temperature detected by the second heating temperature sensor settles to a predetermined temperature; and
   detection means for measuring the flow rate of the fluid according to the difference between the temperatures detected by the first temperature difference sensor and the second temperature difference sensor.

4. A thermal flowmeter according to claim 1, wherein: the first temperature difference sensor comprises a first temperature sensing resistor and a second temperature sensing resistor, and the second temperature difference sensor comprises a third temperature sensing resistor and a fourth temperature sensing resistor; the detection means comprises a bridge circuit formed by connecting a series circuit constituted of the first temperature sensing resistor and the third temperature sensing resistor in parallel with a series circuit constituted of the second temperature sensing resistor and the fourth temperature sensing resistor; and the detection means detects the flow rate of the fluid according to the differential voltage from the bridge circuit.

5. A thermal flowmeter according to claim 1, wherein: a fifth temperature sensing resistor is disposed at a position on the substrate distant from the thin film part to detect the temperature of the fluid; the heating control means comprises a bridge circuit formed by connecting a series circuit constituted of the first heating temperature sensor, the second heating temperature sensor, and a resistor in parallel with a series circuit constituted of the fifth temperature sensing resistor and a resistor; and the heating control means detects the differential voltage from the bridge circuit for controlling the current to be applied to the heater resistor.

6. A thermal flowmeter according to claim 5 wherein the heater resistor, the first and second temperature difference sensors, the first and second heating temperature sensors and the fifth temperature sensing resistor are made of the same material.

7. A thermal flowmeter having a thin film part formed on a substrate and a heater resistor disposed on the thin film part for measuring the flow rate of a fluid, comprising:
   a bridge circuit comprising a first heater resistor, a second heater resistor, a third heater resistor and a fourth heater resistor wherein the third heater resistor and the fourth heater resistor are disposed downstream of the first heater resistor and the second heater resistor in the flowing direction of the fluid to be measured, and the bridge circuit is formed by connecting a series circuit constituted of the first heater resistor and the third heater resistor in parallel with a series circuit constituted of the second heater resistor and the fourth heater resistor;
   a first heating temperature sensor disposed upstream of the first heater resistor and the second heater resistor in the flowing direction of the fluid to be measured and a second heating temperature sensor disposed downstream of the third heater resistor and the fourth heater resistor in the flowing direction of the fluid to be measured;
   heating control means for controlling the heating current to be supplied to the first, second, third and fourth heater resistors based on the temperature detected by the first and second heating temperature sensors so that the average temperature of the first, second, third and fourth heater resistors settles to a predetermined temperature; and detection means for measuring the flow rate of the fluid according to the differential voltage from the bridge circuit.

8. A thermal flowmeter according to claim 7 wherein: a temperature sensing resistor is formed at a position on the substrate distant from the thin film part to detect the temperature of the fluid; the bridge circuit is formed by connecting a series circuit constituted of the first heating temperature sensor, the second heating temperature sensor and a resistor in parallel with a series circuit constituted of the temperature sensing resistor and a resistor; and the heating control means controls the heating current to be supplied to the first, second, third and fourth heater resistors based on the differential voltage from the bridge circuit.

9. A thermal flowmeter according to claim 8 wherein the first, second, third and fourth heater resistors, the first and second heating temperature sensors and the temperature sensing resistor are made of the same material.

10. A thermal flowmeter according to claim 9 wherein the first, second, third and fourth heater resistors, the first and second heating temperature sensors and the temperature sensing resistor are made of a metal material having a temperature coefficient of resistance not lower than 1000 ppm/° C.

11. A thermal flowmeter having a thin film part formed on a substrate and a heater resistor disposed on the thin film part for measuring the flow rate of a fluid, comprising:

a bridge circuit comprising a first heater resistor, a second heater resistor, a third heater resistor and a fourth heater resistor wherein the third heater resistor and the fourth heater resistor are disposed downstream of the first heater resistor and the second heater resistor in the flowing direction of the fluid to be measured, and the bridge circuit is formed by connecting a series circuit constituted of the first heater resistor and the third heater resistor in parallel with a series circuit constituted of the second heater resistor and the fourth heater resistor;

a first heating temperature sensor disposed on top of the first heater resistor and the second heater resistor via an insulation film and a second heating temperature sensor disposed on top of the third heater resistor and the fourth heater resistor via an insulation film;

heating control means for controlling the heating current to be supplied to the first, second, third and fourth heater resistors based on the temperature detected by the first and second heating temperature sensors so that the average temperature of the first, second, third and fourth heater resistors settles to a predetermined temperature; and detection means for measuring the flow rate of the fluid according to the differential voltage from the bridge circuit.

* * * * *